Jan. 24, 1956
N. D. EAGON
2,731,938
FUEL TANK GAGE
Filed Sept. 10, 1953
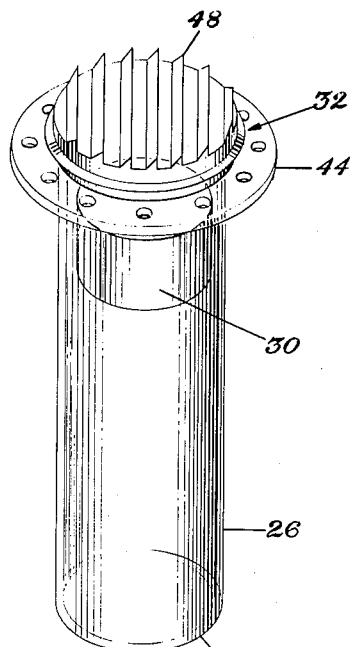
Fig. 1
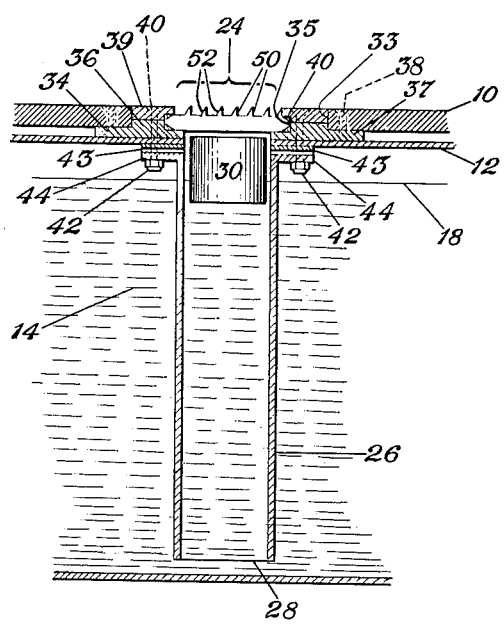
Fig. 2
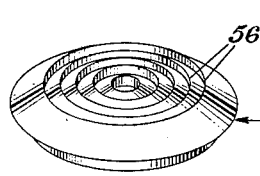
Fig. 3
Fig. 4
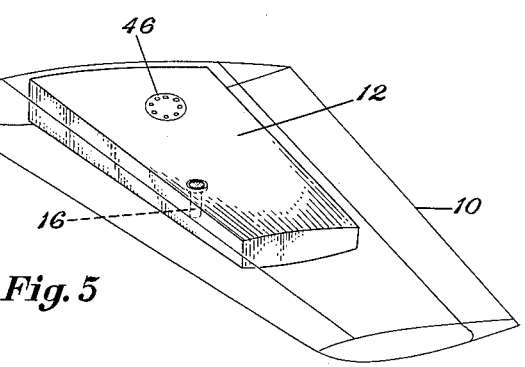
Fig. 5
Fig. 6
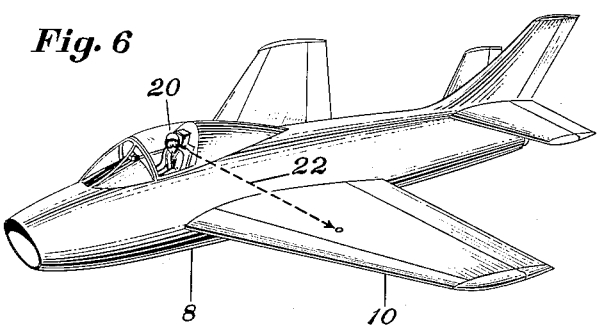
INVENTOR.
Norton D. Eagon
BY
W. R. Robertson
Agent

United States Patent Office 2,731,938
Patented Jan. 24, 1956

2,731,938

FUEL TANK GAGE

Norton D. Eagon, Grand Prairie, Tex., assignor, by mesne assignments, to Chance Vought Aircraft, Incorporated, a corporation of Delaware Application September 10, 1953, Serial No. 379,333

6 Claims. (Cl. 116—118)

This invention deals with aircraft fuel gages, and is particularly concerned with gages used as external indicators showing when the fuel tank is completely full.

It is therefore an object of this invention to provide an indicator for visually checking the fullness of a fuel tank from a distance wherein the level indicator is visible externally of the cell without need of viewing complex electrical or mechanical measuring devices.

Another object of this invention is to provide an improved level indicator for a fuel tank which is economical to construct and which is of the utmost structural simplicity and light weight.

A more specific object is to provide a fuel level indicator which provides a visual liquid level signal of novel form.

Yet another object of this invention is to provide a fuel gage which will conspicuously show the need of additional fuel when the level falls to a point which will not allow a colored float to be observed.

Other objects and advantages will be apparent from the specification and claims, and from the accompanying drawings which illustrate an embodiment of the invention.

In the drawings:

Fig. 1 is a perspective view of the tubular cage member, float and prismatic cover of the invention;

Fig. 2 is a detailed side view showing the installation of the fuel level indicator of this invention within an airplane fuel tank;

Fig. 3 shows a variation in the type of cover from that shown in Fig. 1;

Fig. 4 shows a cross-section of the prismatic cover of Fig. 3;

Fig. 5 indicates the location of the device of this invention within the fuel tank of a wing of an airplane; and Fig. 6 shows an airplane and the pilot's line of vision to the fuel level indicator of this invention.

The basic information needed by the pilot of an aircraft prior to take-off regarding fuel load, is, in many cases, only the knowledge that his fuel tanks are full, thus assuring him that the craft contains sufficient fuel for him to accomplish his mission. Heretofore, fuel gages have been used including a float in the tank, an indicator instrument on the dash panel and the complex connections between the two. It will be readily understood that the saving of weight in aircraft design is of prime importance. The present invention results in weight and space saving in aircraft by providing a simple indicator comprising a tubular cage immersed in the tank, an indicator float within the tube and a prismatic cover over the tube positioned in the pilot's line of vision.

Fig. 6 shows an airplane having a wing 10 which is further illustrated in Fig. 5 as having an integral fuel tank 12 to contain fuel 14. The fuel level indicator of this invention is generally indicated at 16 to show when the fuel level 18 is at or near the top of the tank. With this gaging device 16 installed, all the pilot need do while seated in his airplane cockpit 20, prior to take-off, is to sight angularly to the wing 10 toward the gage 16, his line of vision being indicated in Fig. 6 by the numeral 22. If, when his eye can see the float within the tank, usually a bright color signal indicated generally by the numeral 24 showing across the lens 32 of the device 16 (Fig. 2), he will immediately know that he has a full load of fuel in tank 10. Should the pilot not receive the visual signal 24, after sighting toward the device 16, he will realize that he has a low fuel supply, and the tank should be filled to its capacity.

It has formerly been the practice of the pilot to observe an indicator gage which was located on the dash panel inside the cockpit. This type installation necessitated electrical and mechanical means for gaging the level of fuel 18 within the tank 12. Such an installation also constituted an unnecessary weight penalty which is inherent therein. Moreover, the visual fuel level indicator 16 of this invention may be so constructed as to offer information to others in addition to the pilot as to the fuel level 18 within the tank 12. Heretofore, the members of the airplane ground crew could not determine the fullness within the tank 12 from without the airplane. They either had to use a dip-stick through an opening in the top of the wing into the tank or else view the indicator gage on the cockpit dash-panel. Thus, through this invention an effective pre-flight check can be evolved, whereby a double check on the fuel supply by both the pilot and the ground crew may be accomplished.

The gaging device 16, as shown in detail in Figs. 1 and 2, includes a cage member 26 having an open end 28 forming the body of the device 16 inserted into the wing fuel tank 12 in such a manner as to expose the open bottom end 28 to the fuel 14 within the tank 12. The cage member 26 is tubular or cylindrical in shape, and contained within the cage member is an indicator float 30, the prime purpose of which is to indicate the full or near full condition of the fuel level 18 within the wing fuel tank 12. The indicator float 30 is made of a buoyant material impervious to the deteriorating effects of hydrocarbons such as airplane fuel and oil or else a sealed device adapted to float on the surface 18 of the liquid 14 within said tank 12. A very convenient and inexpensive member to use as the float is a spherical table tennis or common ping-pong ball, although a cylindrically shaped member such as shown in Figs. 1 and 2 presents a greater flat surface than a sphere and can therefore be more readily seen. The spherical or the upper surface of the cylinder of float 30 may be white or may be painted with a color such as bright red, yellow, orange or any other bright color which will be in sharp contrast to the color of the surrounding wing surface. A cover 32 provides a closure member for the upper surface of said cage member 26 and is constructed of any suitable transparent material such as glass or plastic of the methyl methacrylate resin type. The cover 32 is held in its position within a wing aperture 33 substantially flush with the surface of the wing in the following manner. A spacer ring 34 having a central aperture 35 has an upstanding annular shoulder 36 which closely fits within wing aperture 33 and has an annular flange 37 which is riveted to wing skin 10 by rivets 38. The lens or cover 32 is positioned within shoulder 36 over aperture 35 and is held in place by an annular retainer ring 39 which fits snugly within wing aperture 33 and extends over the rim of lens 32, the periphery of lens 32 being sealed with an O-ring type gasket or suitable sealing compound 40. After its top surface has been covered with a breather gasket 43, the outwardly extending flange 44 at the top of cage member 30 is secured to the spacer ring 34 and the retainer ring 39 by a series of bolts 40 which pass through suitable apertures in those parts and are secured by nuts 42, access to the nuts 42 and cage 30 for the purpose of fastening the same being had by removing cover plate 46 over a hand hole into tank 12. Breather gasket 43 is of a type having apertures within its body extending from the outer periphery to the inner aperture thus providing a means of air escape from cage member 30.

The upper surface of lens 32 is provided with a series of spaced parallel prisms 48 molded integral with the main body of lens 32 or machined therefrom. Prisms 48 are substantially triangular in cross-section, presenting a surface 50 which is normal to the pilot's line of vision and surface 50 accordingly may be substantially perpendicular to the surface of the main body of lens 32 or to the lower surface thereof or to the upper surface of the airplane wing, or may be slightly angularly disposed to those surfaces. Prisms 48 also have an inclined reflecting surface 52 substantially at a 45° angle to the plane of surface 50. The cover or lens 32 is so positioned at the time of assembly that the plane of surface 50 is normal to the line of vision 22 of the pilot. Thus positioned, light is reflected from the top surface of float 30 through the body of lens 32 and is refracted by surface 52 of prisms 48 through surface 50 to the line of vision 22. It will be understood, of course that, if float 30 is not at or near the top of cage 26, the light entering cage 26 will be too diffused by the time it is reflected back from the float 30 through prisms 48 for the pilot to see float 30, in which case he would know that the fuel tank 12 was not full and needed filling.

If desired, the alternate lens 54 shown in Figs. 3 and 4 may be substituted for lens 32 with which it is similar except that the prisms are in the form of spaced concentric rings 56 which present the prismatic effect of less than half of the surface of the lens to the pilot's line of vision but has the advantage of presenting the same prismatic effect to a line of vision normal to the surface 60 of prisms 56 at any point through a 360° range around lens 54, thus allowing ground crew personnel as well as the pilot to visually check the fullness of the wing fuel tank.

It will be evident that this invention provides a simple, economical means for checking the fullness of a fuel tank from a remote point without the need for complex connections, gauges and instruments.

While only one embodiment of the invention has been shown in the accompanying drawings, it will be evident that various modifications are possible in the arrangement and construction of the fuel gage components without departing from the scope of the invention.

I claim:

1. A liquid level indicator for an airplane wing fuel tank comprising a cage member having an open base inserted into said tank, a colored float within said cage member to serve as a signal, a transparent closure for the upper end of said cage member having a substantially flat lower surface, and an upper surface substantially flush with the surface of the airplane wing, and a series of parallel prisms integral with the upper surface of said cover each having one plane surface disposed on a plane substantially normal to the lower surface of the cover and a reflecting surface angularly disposed to said one plane surface, whereby a view of said colored float is provided along a line of vision angularly disposed to the reflecting surface of said prisms when the liquid within said tank is substantially at the capacity of said tank.

2. A liquid level indicator for a tank comprising, a cage member having an open base inserted within said tank, a float inserted within said cage member to serve as an indicator, an optically clear cover having a substantially flat lower surface forming a closure for the upper end of said cage member, and a series of concentric annular prisms integral with the exposed face of said cover, each of said prisms having one plane face substantially normal to said lower surface and a second plane face inclined on an angle to said lower surface, whereby said float can be observed on a line of vision angularly disposed to the inclined plane of said prisms when said float is substantially contiguous to said cover.

3. A means for indicating the fullness of a fuel tank within the wing of an airplane comprising, a cage member inserted within said tank, a colored float indicator within said cage to serve as a signal to indicate the liquid level of the fuel when the same is near the top of said tank, and a prismatic cover closing the upper end of said cage member including a series of parallel prisms transverse the upper surface of said cover and having a substantially flat lower surface, said prisms each presenting one plane surface substantially normal to said substantially flat lower surface of said cover and a reflecting surface angularly disposed to said substantially flat lower surface of said cover, whereby said float can be observed on a line of vision angularly disposed to said reflecting surface when said float is in contiguous relationship with said cover.

4. A liquid level indicator for a fuel tank in the wing of an airplane comprising, a cage member having open ends inserted within said tank, means for securing said cage member to said tank with an open end facing the upper surface of said wing, a float member confined within said cage and adapted to float on the top of the liquid fuel, a transparent closure member for the open end of said cage member positioned substantially flush with the upper surface of said wing and secured thereto and having a flat lower surface disposed toward said float member, and a prism secured to the upper surface of said closure member to refract light waves from the surface of said float when the same is contiguous with said closure member to a line of vision angularly disposed to the plane of the upper surface of said wing, said prism having one plane surface substantially normal to the flat lower surface of said closure member and a reflecting surface angularly disposed to said flat lower surface.

5. A liquid level indicator for a fuel tank in the wing of an airplane comprising, a cage member having open ends inserted within said tank, means for securing said cage member to said tank presenting an open end facing an aperture in the upper surface of said wing, a float member confined within said cage and adapted to float on the surface of the liquid fuel, a transparent closure member for the open end of said cage member positioned substantially flush with the upper surface of said wing and secured thereto, and a plurality of spaced parallel prisms on the upper surface of said closure member, each of said prisms having one plane surface substantially normal to the plane of the upper surface of the wing and a reflecting surface angularly disposed to said first plane surface, whereby light waves from the surface of said float when the same is contiguous to said closure member will be refracted by said prisms to a line of vision angularly disposed to the plane of the upper surface of said wing.

6. A liquid level indicator for a fuel tank in the wing of an airplane comprising, a cage member having open ends inserted within said tank, means for securing said cage member to said tank presenting an open end facing an aperture in the upper surface of said wing, a float member confined within said cage and adapted to float on the surface of the liquid fuel, a transparent closure member for the open end of said cage member positioned substantially flush with the upper surface of said wing and secured thereto and having a substantially flat lower surface disposed toward said float member, and a plurality of spaced concentric prisms on the upper surface of said closure member, each of said prisms having one plane surface being disposed on a plane substantially normal to the lower surface of the closure member and a reflecting surface angularly disposed to said lower surface of the closure member, whereby light waves from the surface of said float when the same is contiguous to said closure member will be refracted by said prisms to a line of vision angularly disposed to the plane of the upper surface of said wing.

References Cited in the file of this patent

UNITED STATES PATENTS

| | | |
|---|---|---|
| 1,576,897 | Boizard | Mar. 16, 1926 |
| 1,883,971 | Kryzonowsky | Oct. 25, 1932 |
| 2,616,941 | Lasko | Nov. 4, 1952 |
| 2,627,748 | Mayback | Feb. 10, 1953 |
| 2,637,209 | Kendall | May 5, 1953 |